United States Patent [19]

Holecek

[11] Patent Number: 4,475,281
[45] Date of Patent: Oct. 9, 1984

[54] TRANSDUCER HEAD POSITIONING ADAPTER FOR FIXED HEAD FLEXIBLE DISK DRIVES

[75] Inventor: Joseph J. Holecek, Kasson, Minn.

[73] Assignee: International Business Machines Corporation, Armonk, N.Y.

[21] Appl. No.: 334,112

[22] Filed: Dec. 24, 1981

[51] Int. Cl.³ .......................... H01F 27/06; G11B 5/48
[52] U.S. Cl. ........................................ 29/603; 360/104
[58] Field of Search ....................... 360/104, 103, 102; 29/467, 603

[56] References Cited

U.S. PATENT DOCUMENTS 3,812,579  5/1974  Roes ...................................... 29/603
4,250,530  2/1981  Yang ..................................... 360/103

Primary Examiner—Bernard Konick
Assistant Examiner—Paul Stefanski
Attorney, Agent, or Firm—Robert W. Lahtinen

[57] ABSTRACT

A transducer-carriage assembly is shown which includes an intermediate adapter that enables the subassembly to be fabricated in a manner that eliminates the effect of tolerances in the component parts, prior to incorporation into the final assembly, with respect to penetration, pitch and roll of the transducer.

2 Claims, 3 Drawing Figures

TRANSDUCER HEAD POSITIONING ADAPTER FOR FIXED HEAD FLEXIBLE DISK DRIVES

BACKGROUND OF THE INVENTION

This invention pertains to flexible magnetic disk drives and more particularly to flexible magnetic disk drives which employ a fixed head.

In flexible magnetic disk drives using a transducer that is fixed to a solid mounting such as a button and secured to a carriage that is linearly positioned along a pair of supporting rods or ways, a fabrication difficulty arises from the accumulation of tolerances that may be encountered during assembly. The accumulated tolerances of the individual parts can result in a dimensional variation in the final assembly that makes the device unacceptable for use. Flexible files are often used where moderate cost direct access storage is required and fixed head transducer mountings normally are used in the least costly flexible file devices. To hold individual parts to closer or stricter tolerances to meet quality requirements defeats the low cost objective.

Flexible files, in common with all data storage products, constantly strive to be more useful and effective through increasing both bit densities and track densities. Another limiting factor inherent in most flexible file drive applications is the requirement that a disk may be recorded on one drive and read on another drive. One of the most common applications of flexible files is as a vehicle for loading information such as programs or data into a system using a disk media that is purchased or at least secured from a source which used another drive to record the data.

In the device of the present invention the fixed transducer button is secured to the carriage of the drive using a sleeve-like adapter between the carriage boss and the transducer assembly. Using a simple fixture to support the carriage and transducer with the adapter intermediate the transducer support and the carriage boss, the adapter and carriage boss may be bonded using an adhesive which is cured using an acceleratorcatalyst when the correct positioning is achieved. Using the adapter and such a mode of assembly, it is possible to fabricate the carriage assembly including the transducer in a manner that eliminates composite part tolerances with respect to the head penetration and the pitch and roll of the head.

DETAILED DESCRIPTION

Figure 1:
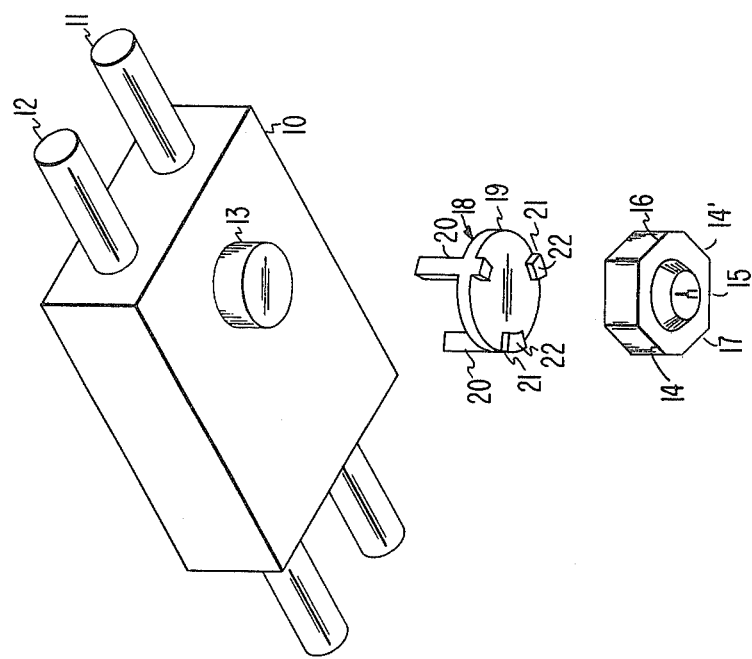
FIG. 1 is an exploded view of a transducer button, a carriage body and the adapter of the present invention with the carriage body shown with guide elements journaled therethrough.
Figure 3:
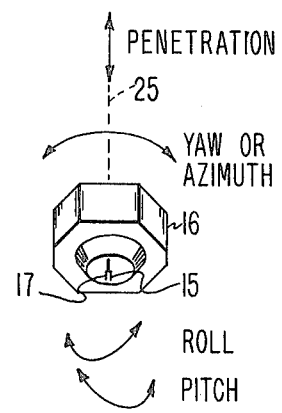
FIG. 3 is a view of the transducer button of FIG. 1 also showing the various rotational and linear constraints associated with the transducer.

Referring to FIG. 1, the transducer carriage assembly includes a carriage body 10 shown journaled about a pair of precision guide rods 11 and 12 which are utilized for purposes of assembly and correspond to the rods or ways upon which the assembled carriage is mounted in the final drive structure for linear radial movement from one track location to another. Carriage body 10 also includes a downwardly depending mounting boss to which the transducer, carried by a button 16, is attached. The transducer button is also shown in FIG. 3. The transducer pole pieces 15 are exposed at the surface 17 of the button 16. Flexible files normally include a tunnel erase wherein a pair of trailing write gaps follow the data write gap to erase the fringe fields at each transverse side of the data track. As shown in octagonal edge 14 is aligned with the leading end of the pole pieces 15 and octagonal edge 14' is aligned with the trailing ends of the pole pieces. The pole piece gaps occur transversely to the pole pieces 15 with the read/write gap occurring in the single element leading portion and the erase gap respectively in the dual element trailing portion, with such gaps located near the crest of the convex surface 17.

The adapter 18 includes a disk shaped central portion 19 from which extend three upper legs 20 (of which two are visable) and three lower legs 21 which present surfaces 22 that abut the upper surface of the transducer button 16 in the assembled condition. The adapter legs 20 radially confine the adapter with respect to the boss 13 when axially assembled thereabout.

As seen in FIG. 3, the penetration of the button 16 is the position along the axis 25. Yaw or azimuth is rotation of the button 16 (and thereby the transducer) about the axis 25. Roll is pivoting of the button 16 about an axis perpendicular to axis 25 and substantially parallel to the major surfaces of the pole pieces 15. Pitch is pivotal movement of the button 16 about an axis perpendicular to the axis 25 and the major surfaces of pole pieces 15.

Figure 2:
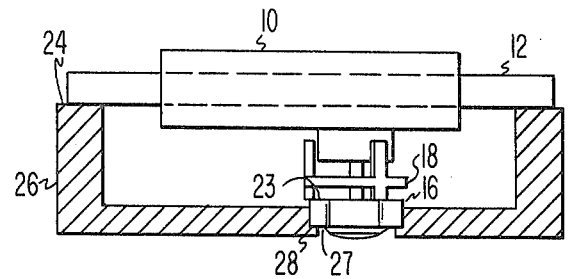
FIG. 2 shows the carriage assembly of FIG. 1 in conjunction with an assembly fixture.

FIG. 2 shows the carriage 10, button 16 and adapter 18 positioned in a fixture 26. The rods 11 and 12 rest on the fixture surface 24. Button 16 is supported and confined within an octagonal opening formed in the lower wall of fixture 26. The dimensional relationship between fixture surface 24 which engages rods 11 and 12 and the substantially octagonal, annular, radial surface 28 against which button surface 27 rests, determines the penetration of button 16 and the positioning of the button respective to body 10 with regard to pitch and roll. With the adapter 18 positioned as illustrated in FIG. 2, the adapter is adhesively bonded to the mounting boss 13 preferably through the application of an adhesive to which a catalyst/curing agent is applied causing the adhesive to cure in a few seconds. Use of this assembly method causes prior component part tolerances to be eliminated with respect to pitch, roll and penetration, such factors being now a function of the dimensional accuracy of the fixture 26. The fixture could locate the transducer relative to any other part of the final drive such as the spindle, if feasible, to eliminate more tolerances.

By providing additional alignment means in the structure of fixture 26 to afford precision constraint of guide rods 11 and 12 during assembly, the rotational position of the button 16 could be fixed using the proper disposition of the octagonal configuration in the fixture recess. This would permit bonding of the transducer button upper surface 23 to the lower leg surfaces 22 of adapter 18. This would complete the mechanical assembly of transducer button and supporting carriage while correcting the yaw or azimuth relationship of the transducer with respect to the carriage assembly.

While the invention has been particularly shown and described with reference to a preferred embodiment thereof, it will be understood by those skilled in the art that the foregoing and other changes in form and details may be made therein without departing from the spirit and scope of the invention.

Having thus described my invention, what is claimed as new and desired to be secured by Letters Patent is:

1. The method of assembling a transducer head assembly to a carriage having a projecting boss using an adapter having a first surface radially confining and axially movable with respect to said carriage boss and a second, radial end surface and a fixture having a positioning surface and alignment surfaces for respectively engaging said carriage and said transducer head assembly in a predetermined dimensional relation to one another comprising placing said carriage and said transducer head assembly in said fixture with said transducer head assembly positioned by said alignment surfaces and said carriage positioned by said positioning surface;

installing said adapter in said fixture with said first surface confining said boss and said second surface abutting said transducer head assembly; and bonding said adapter to said carriage boss and said transducer head assembly while said carriage and said transducer head assembly are positioned by said fixture, whereby the transducer head assembly is positioned by said fixture with respect to said carriage to eliminate cumulative tolerances or dimensional variations between said carriage and said transducer head assembly.

2. The method of assembly of claim 1 wherein said bonding step includes the application of an uncured adhesive and a catalyst-curing agent to effect rapid adhesion of said adapter to said carriage boss and said transducer head assembly.

* * * * *